(No Model.)

R. S. FOLTZ & C. A. PHILLIPS.
GAGE FOR LIQUID IN VESSELS.

No. 602,069. Patented Apr. 12, 1898.

Witnesses:
J. W. Fowler Jr.
Thomas Durant

Inventors:
Roy S. Foltz and
Charles A. Phillips
by Church & Church
their Attorneys.

UNITED STATES PATENT OFFICE.

ROY S. FOLTZ AND CHARLES A. PHILLIPS, OF NEW CASTLE, PENNSYLVANIA.

GAGE FOR LIQUID IN VESSELS.

SPECIFICATION forming part of Letters Patent No. 602,069, dated April 12, 1898.

Application filed April 24, 1897. Serial No. 633,638. (No model.)

*To all whom it may concern:*

Be it known that we, ROY S. FOLTZ and CHARLES A. PHILLIPS, of New Castle, in the county of Lawrence and State of Pennsylvania, have invented certain new and useful Improvements in Gages; and we do hereby declare the following to be a full, clear, and exact description of the same, reference being had to the accompanying drawings, forming a part of this specification, and to the figures of reference marked thereon.

This invention relates to improvements in measuring instruments, and particularly to gages for ascertaining the amount of liquid contained in a vessel or tank; and the invention consists in certain novel details of construction and combinations and arrangements of parts, all as will be now described and the particular features of novelty pointed out in the appended claims.

Figure 1:
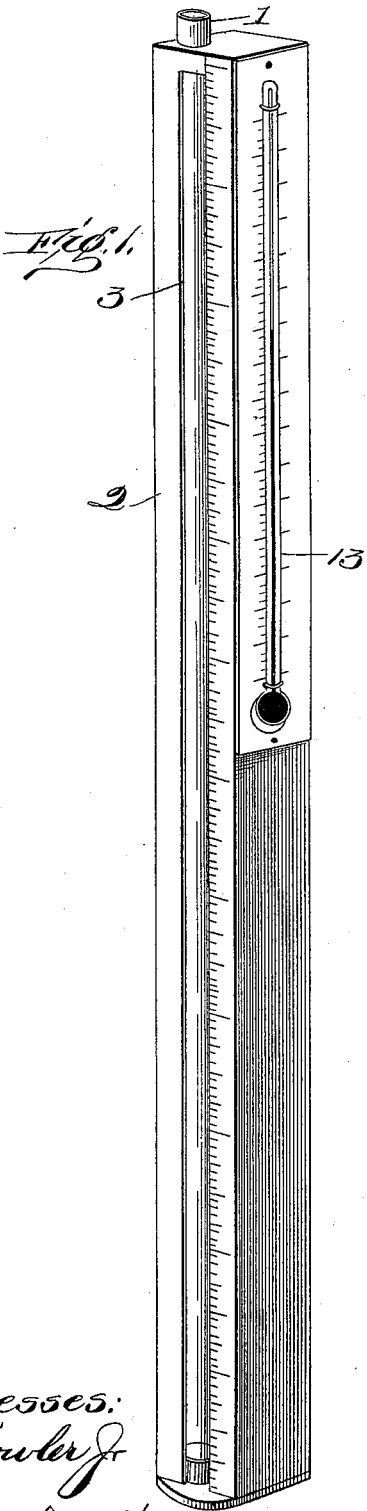
Figure 2:
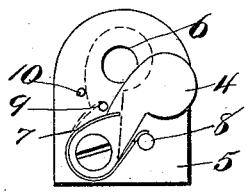
Figure 3:
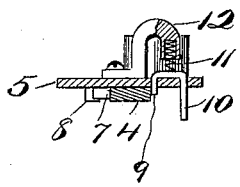

In the accompanying drawings, Figure 1 is a perspective view of the gage constructed in accordance with our invention. Fig. 2 is a bottom view showing the valve in open and closed position in full and dotted lines. Fig. 3 is a section through the valve-plate.

Similar numerals of reference in the several figures indicate the same parts.

In the practical embodiment of our invention a tube 1, of glass or other transparent material and of suitable length and cross-sectional area, is incased in a protective casing 2, of wood or other substance, which is provided with a slot or opening 3 in one side, through which the tube may be seen. The tube 1 is open at both ends, but is adapted to be closed at the lower end by a valve 4, for a purpose to be presently explained.

The valve 4 is pivoted to a plate 5, secured to the lower end of the casing, and is adapted to close the opening 6 in the plate communicating with the lower end of the tube 1. A spring 7, one end of which is secured to the valve and the other abutting against the stud or pin 8, holds the valve normally closed.

For holding the valve retracted against the tension of the spring and for releasing it when desired we employ a holding-pin 9 and releasing-arm or trigger 10, preferably formed from one piece of wire bent to substantially U shape, one branch, however, being somewhat shorter than the other, and each of which extends through openings in the plate 5. The pin and arm are normally held projected by means of a spring 11, received within a recess in the lower end of the arm 12.

The manner of using the gage is as follows: The valve being opened, the gage is immersed in the liquid in the vessel the contents of which is to be measured. The liquid will rise in the glass tube as the gage is lowered, and when the trigger or releasing-arm strikes the bottom of the vessel the holding-pin will be retracted and the valve released, thus closing the bottom of the tube and holding all the liquid that has entered it. When the gage is withdrawn, the height of the liquid can be read through the opening in the casing and ascertained in inches by means of a scale located at the side of the opening. The height of the liquid in inches being known, the quantity of liquid in the vessel can readily be reckoned.

In order that the temperature of the liquid measured may be known, a thermometer 13 is carried by the gage.

The device, it will be seen, is simple and accomplishes admirably the object for which it is intended.

Having thus fully described our invention, what we claim as new, and desire to secure by Letters Patent, is—

1. In a gage the combination with the tube and its inclosing casing, the spring-pressed valve for closing said tube, the pin for holding the valve retracted, and the trigger or arm for releasing the valve; substantially as described.

2. In a gage the combination with the tube and its inclosing casing, the spring-operated valve for closing the tube, the holding-pin and releasing-arm made in one piece; substantially as described.

3. In a gage the combination with the measuring-tube and its inclosing casing, the spring-operated valve for closing the tube, the valve-holding pin and releasing-arm formed in one piece and the spring holding said pin and arm projected; substantially as described.

4. In a gage the combination with the measuring-tube and its inclosing casing, of the spring-operated valve, the valve-holding pin and releasing-arm formed of one piece of wire bent to substantially U shape, with one branch shorter than the other, the shorter branch constituting the holding-pin and the longer the releasing-arm; substantially as described.

ROY S. FOLTZ.
CHAS. A. PHILLIPS.

Witnesses:
GEO. J. POLITE,
ERRETT E. PHILLIPS.